No. 861,938. PATENTED JULY 30, 1907.
H. F. BECHMAN.
CHANGEABLE SPEED DRIVING MECHANISM.
APPLICATION FILED MAR. 19, 1906.
2 SHEETS—SHEET 2.
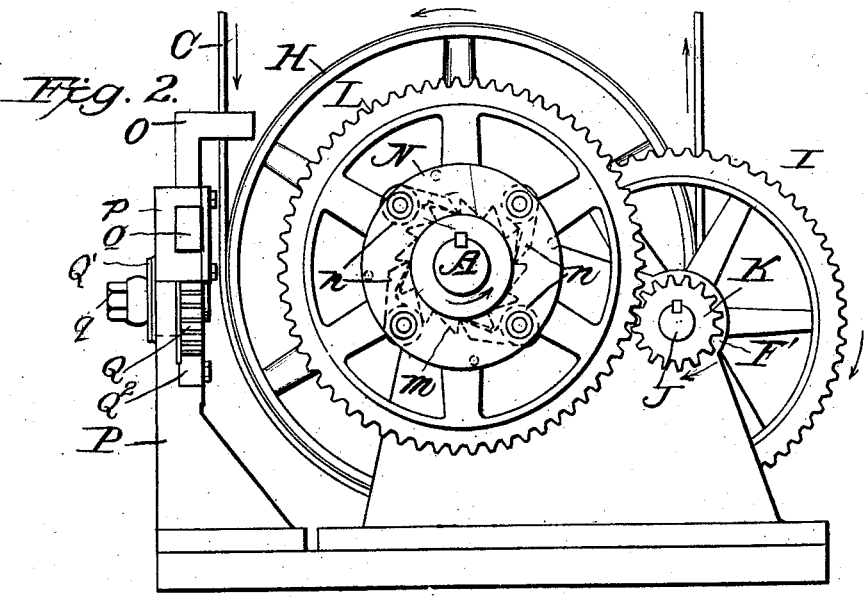
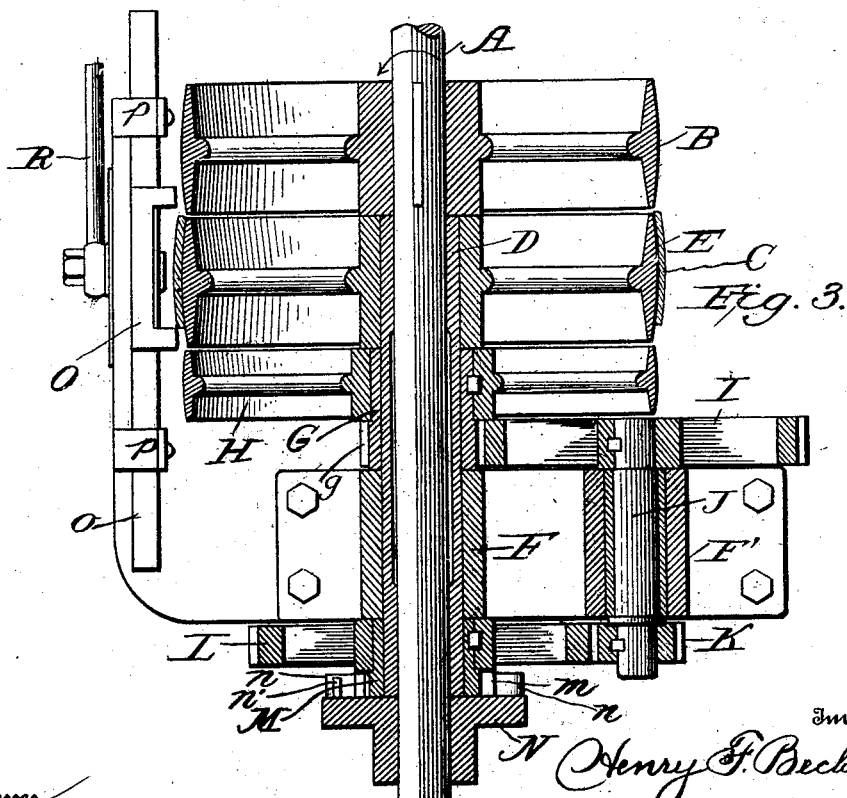

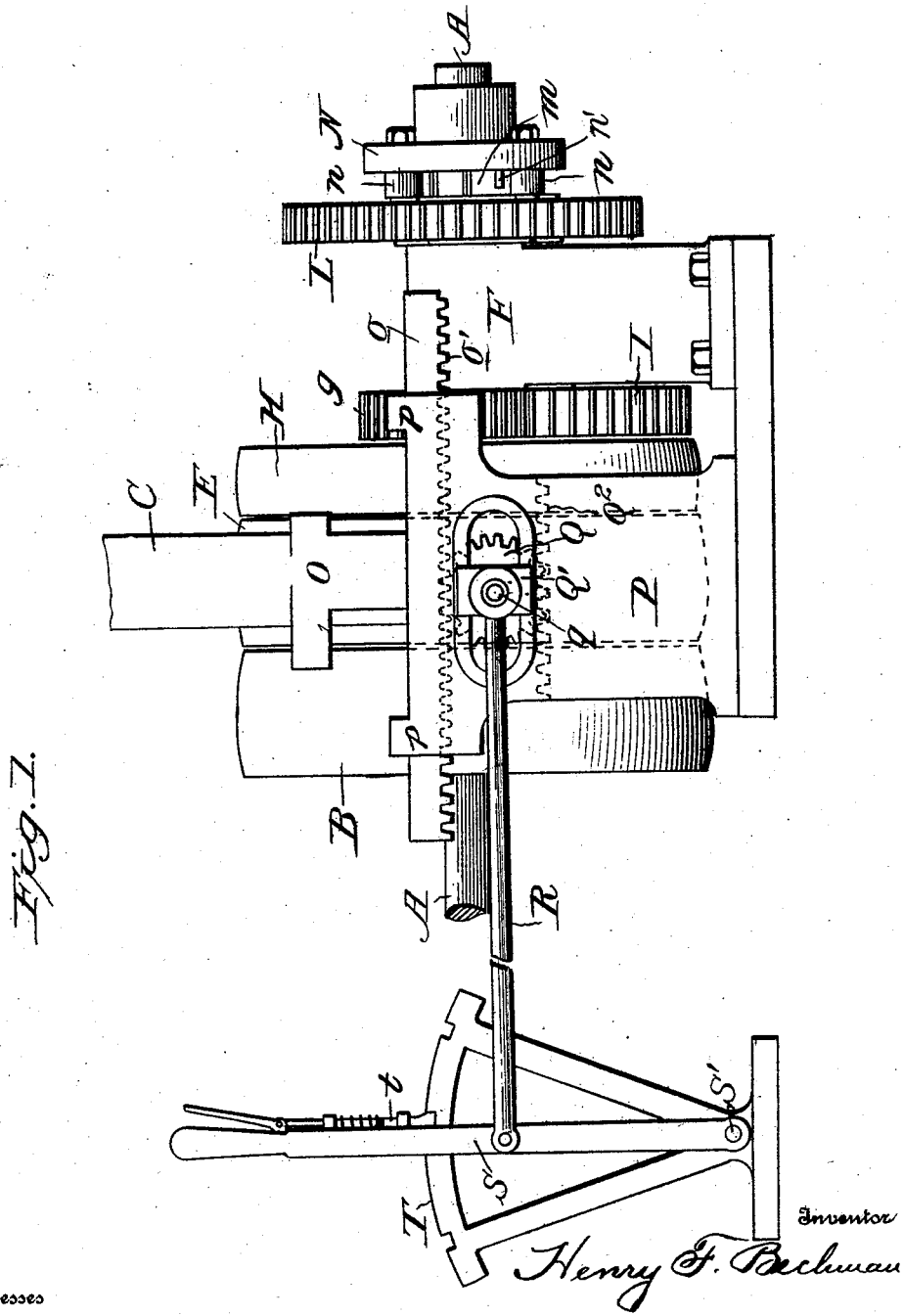

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN.

CHANGEABLE-SPEED DRIVING MECHANISM.

No. 861,938.     Specification of Letters Patent.     Patented July 30, 1907.

Application filed March 19, 1906. Serial No. 306,793.

*To all whom it may concern:*

Be it known that I, HENRY F. BECHMAN, of Battle Creek, in the county of Calhoun and State of Michigan, have invented certain new and useful Improvements in Changeable-Speed Driving Mechanism; and I hereby declare that the following is a full, clear, and exact description thereof, reference being had to the accompanying drawings, which form part of this specification.

This invention is an improved changeable speed driving mechanism particularly adapted for printing-presses, planers and other large and heavy machines, wherein a slow speed is sometimes desired, as in making ready, but which are adapted to normally operate at a high speed; and its object is to provide a device whereby the main-driving shaft of the machine can be driven at different speeds by means of similar sized belt-pulleys adapted to be driven by a shifting belt from a single prime driver, which belt can be shifted from the low speed to the high speed pulley at will. Both pulleys drive the machine main shaft in the same direction, but at different speeds, the difference in speed being obtained by means of novel gearing and clutching mechanism between the low speed pulley and the main shaft, which clutching mechanism may be automatically thrown out of operation by centrifugal force when the belt is shifted onto the high speed pulley. I also provide, preferably between the low and high speed pulleys, an idler pulley so that by shifting the driving belt to an intermediate position the machine can be stopped.

The invention will be fully understood from the following description and is well illustrated in the accompanying drawings, in which—

Figure 1 is a side elevation. Fig. 2 is an end elevation; and Fig. 3 is a horizontal section of the variable speed driving mechanism.

In the drawings, A represents the main power shaft of the machine to which the variable speed mechanism is applied; and which machine may be a printing-press, or any other machine. On this shaft A is keyed a belt-pulley B which can be driven by a belt C from any suitable driver. On the outer end of shaft A is loosely mounted a sleeve D, the inner end of which is adjacent to pulley B and on this inner end is journaled a loose pulley E of same diameter as pulley B. The sleeve D is fast in bearing F on a suitable framing and forms a boxing or journal bearing for shaft A which can rotate in this sleeve. On the sleeve D intermediate the bearing F and the pulley E is rotatably mounted a second sleeve G on which is keyed the "slow" pulley H corresponding in diameter with the pulleys B and E. On the outer end of sleeve G is secured or formed a small pinion $g$ which meshes with a larger gear I mounted on the stub-shaft J journaled in bearing F′, parallel with bearing F, and on the outer end of shaft J is keyed a small pinion K which meshes with a large pinion L keyed on a collar M loosely mounted on the outer end of the sleeve D. On the outer end of collar M is secured or formed a ratchet $m$, which is adapted to be engaged by dogs $n$ pivoted on a disk N keyed on the outer end of shaft A. These dogs are free to swing outwardly away from the ratchet but are limited in their outward movement by pins $n'$ or other suitable means.

The driving belt C always runs in one direction, as indicated in the drawings, and consequently is adapted to drive the wheels B, E, H, in the same direction; but when the belt is shifted onto pulley H motion will be transmitted therefrom through the gears $g$, I, K, L, to ratchet $m$ and the latter through dogs $n$ and disk N will rotate shaft A slowly in the direction indicated by the arrows in the drawings, which is the direction in which the pulley H is driven. In this instance it will be observed that the ratchet drives the dogs, instead of the dogs driving the ratchet. If the belt be now shifted onto the pulley E, which runs loosely on sleeve D, the shaft A will stop as there is nothing to drive it. The loose pulley in the construction shown rotates idly on the sleeve D and not directly on the shaft. If instead of stopping the belt on pulley E it is carried over onto pulley B, full speed will be imparted to shaft A in the same direction imparted thereto from pulley H. When shaft A takes up full speed the dogs $n$ leave the ratchet $m$ and swing out by centrifugal force away from the ratchet until stopped in their outward movements by pins $n'$, on disk N, or any other suitable means, so that there is no noise nor clicking in the clutch device. By this construction I am enabled to control the speed of the machine, high or low, by a single belt-shifter, which can throw the belt onto any one of the pulleys desired.

I have shown a belt-shifter O engaging belt C, and in starting the machine the belt should be shifted onto pulley H, whereby the machine is started up at a slow speed, and without the great shock and strain to which the parts are subjected ordinarily in attempting to start such machines by shifting the belt directly onto the fixed pulley B. After the shaft A is in motion at the slow speed, if it is desired to accelerate it to full speed, the belt is shifted at once across from pulley H onto pulley B,—the momentum of the parts being sufficient to keep them in motion during this shifting of the belt from pulley H to pulley B,—and as the belt picks up pulley B full speed is imparted to the machine with practically no jar or shock. This shifting of the belt can be accomplished preferably by the following devices. The shifter O is mounted on a sliding bar $o$ guided in brackets $p$ attached to an upright or bracket P, and said bar $o$ has a rack $o'$ on its under side engaged by a pinion Q journaled on a stud $q$ attached to a sliding plate Q′ guided in a slot in bracket P. The lower side of pinion Q meshes with a fixed rack Q² attached to bracket P below the gear; consequently as the gear Q is moved linearly it imparts a much more rapid linear movement to the bar $o$ and belt-shifter O, and thus a comparatively slight movement of the plate Q′ will suffice to completely shift the belt from pulley H onto pulley B, or vice versa. The plate Q′ may be shifted by means of a rod R, connected to a lever S pivoted at S′ to any suitable support. Lever S is provided with a hand-latch $t$ adapted to engage notches in a segment T, which is provided with three notches. When the lever is locked in the center notch the belt C will be on the idle-pulley; when locked in the right-hand notch the belt will be on the slow driving pulley H; and when locked in the left-hand notch the belt will be on the driving pulley. The operator, therefore, in starting the machine should first push the lever over to the right-hand notch thereby throwing the belt onto the slow pulley, then by throwing the lever directly over onto the left-hand notch he can shift the belt onto the high speed pulley and the machine will operate at full speed. By shifting the lever to the middle notch the machine will be stopped. A peculiar feature of this mechanism is the fact that the members of the clutch device are automatically disengaged as soon as the belt is shifted onto the high speed pulleys. When driven at slow speed motion is imparted to the shaft A from the ratchet $m$ through dogs M and N, the ratchet pushing the dogs; but as soon as the shaft takes up the high speed the dogs run away from the ratchet and fly open by gravity so as to clear the teeth of the ratchet and will remain held out by centrifugal force as long as the shaft rotates at high speed so that there is no noise or clicking attendant on the use of this form of clutching device, and the slow speed pulley and parts can remain idle and stationary like the idler pulley when the machine is operating at high speed.

The advantages of this changeable speed mechanism will be appreciated by those familiar with the trouble experienced with the present known commonly used starting devices for printing-presses and other machines.

Having described my invention what I claim as new and desire to secure by Letters Patent is:

1. In a changeable speed mechanism, the combination of a driven shaft, a high-speed pulley keyed thereon, a low-speed pulley and a ratchet loosely mounted on said shaft, an idler-pulley intermediate the high speed and low speed pulleys; a reducing train of gears for the ratchet from the low-speed pulley, a disk keyed on the shaft, and centrifugally acting pawls pivoted on said disk and adapted to engage the ratchet at low speed.

2. The combination of a driven shaft, a high-speed pulley keyed thereto, a sleeve on said shaft, a low-speed pulley and a ratchet-gear loosely mounted on said sleeve; with reducing gearing between the low-speed pulley and said ratchet for rotating the latter, a disk keyed on the shaft adjacent the ratchet gear, and centrifugally acting pawls carried by said disk adapted to engage and be driven by the ratchet when the low-speed pulley is driven, and to automatically disengage the ratchet when the shaft is driven at high-speed.

3. In a changeable speed mechanism, the combination of a driven shaft, a pulley and disk keyed thereon, a loose sleeve on said shaft intermediate the pulley and disk, a low-speed pulley loosely mounted on said sleeve, an idler pulley between the high and low-speed pulleys, a ratchet loosely mounted on said sleeve, a gear fixed to the ratchet, intermediate gears for rotating the ratchet gear from and by the slow-speed pulley, and gravital dogs pivoted on said disk, and adapted to engage the ratchet and be driven thereby when the low-speed pulley is driven and to automatically disengage the ratchet when the high-speed pulley is driven, substantially as described.

In testimony that I claim the foregoing as my own, I affix my signature in presence of two witnesses.

HENRY F. BECHMAN.

In presence of—
  CHARLES G. MECHEM,
  FRANK W. DUNNING.